United States Patent [19]
Gripe et al.

[11] 3,926,444
[45] Dec. 16, 1975

[54] SEAL RING

[75] Inventors: William B. Gripe, Concord; Melvin H. Norman, Oakland, both of Calif.

[73] Assignee: Amot Controls Corporation, Richmond, Calif.

[22] Filed: Aug. 27, 1973

[21] Appl. No.: 391,679

[52] U.S. Cl. ............................................... 277/177
[51] Int. Cl.² ............................................. F16J 9/00
[58] Field of Search ........................ 277/173–177, 277/171, 165; 251/DIG. 1; 285/DIG. 19

[56] References Cited
UNITED STATES PATENTS

| | | | |
|---|---|---|---|
| 3,031,200 | 4/1962 | Hamer | 277/177 |
| 3,377,076 | 4/1968 | Burnett | 277/171 |

FOREIGN PATENTS OR APPLICATIONS

| | | | |
|---|---|---|---|
| 419,751 | 8/1966 | Switzerland | 277/177 |

*Primary Examiner*—Robert I. Smith
*Attorney, Agent, or Firm*—Warren, Chickering & Grunewald

[57] ABSTRACT

A seal ring adapted for mounting in a ring groove and comprising a torus portion dimensioned for reciprocal movement between the groove sidewalls and for extending from the groove into sealed engagement with a relatively movable surface; and pressure responsive means for driving the torus portion across the interior of the groove and into sealing engagement with the sidewalls thereof, such means comprising an annular flexible and compressible web secured concentrically to and extending radially from the torus portion and having a free peripheral edge dimensioned for pressure seal fit with the root wall of the groove.

2 Claims, 6 Drawing Figures

SEAL RING

The invention relates to rubber O rings.

Two basic types of O rings are in common use. In one type, the O ring is dimensioned so as to provide mechanical squeezing of the ring between the root surface of the ring groove and the opposed cylindrical surface to be sealed, thus providing a simultaneous pressure fit with both of these surfaces. When properly installed this type of O ring provides a very satisfactory seal. However, the requirements of commercial tolerances in cylinders, pistons, and O rings requires designing for a considerable amount of squeeze with attendant high friction forces.

A second type is the so-called floating O ring fit in which the compression of the O ring against the adjacent cylindrical surface is maintained, but the internal diameter of the O ring is spaced from the root wall of the groove. In this type of O ring seal, sealing is effected at the sidewalls of the groove and the adjacent cylindrical surface. Substantially less friction is normally found in this type of seal. However, to obtain a seal it is essential that the O ring be moved laterally across the interior of the ring groove and into sealing engagement with one of the groove sidewalls. Such displacement will dependably occur when there is a rapid application of pressure or "blast" to move the ring into its sealing position. When the pressure builds up slowly as may occur in many applications, there is frequently sufficient leakage around the ring to prevent the pressure build-up required to move the ring into sealing position.

An object of the present invention is to provide a seal ring of the character described which will provide sure and dependable sealing of the associated reciprocating parts under conditions of either a slow or fast pressure build-up at the ring groove.

Another object of the present invention is to provide a seal ring of the above character which will accomplish the sure and dependable sealing as above noted with significantly reduced friction.

A further object of the present invention is to provide a seal ring of the character above having an increased life span affording superior sealing action over long, trouble-free, repetitive use.

The invention possesses other objects and features of advantage, some of which of the foregoing will be set forth in the following description of the preferred form of the invention which is illustrated in the drawing accompanying and forming part of this specification. It is to be understood, however, that variations in the showing made by the said drawing and description may be adopted within the scope of the invention as set forth in the claims.

Referring to said drawing.

Figure 1:
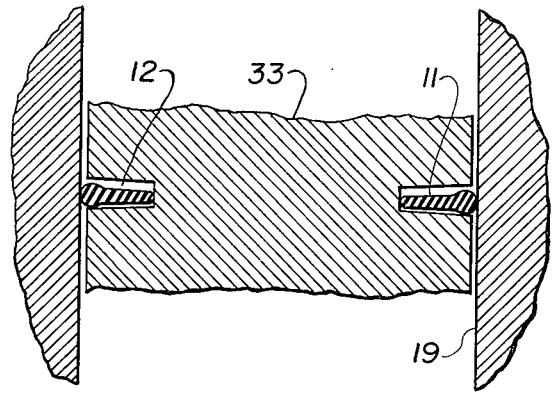
FIG. 1 is a cross sectional view of a seal ring constructed in accordance with the present invention and shown in operative association with the parts to be sealed.

The seal ring 11 of the present invention is adapted for mounting in a conventional ring groove 12 having a root wall 13 and opposed sidewalls 16 and 17 and comprises briefly a torus portion 18 dimensioned for positioning in groove 12 for reciprocal movement between sidewalls 16 and 17 and extending from the open side of the groove for engagement with a relatively movable surface 19 to be sealed; and pressure responsive means for driving the torus portion 18 across the interior of the groove and into sealing engagement with one of the sidewalls and which here comprises an annular, flexible, and compressible web 21 secured concentrically to and extending radially from the torus portion 18, and importantly, having a free peripheral edge 22 dimensioned for pressure seal fit with root wall 13.

Figure 4:
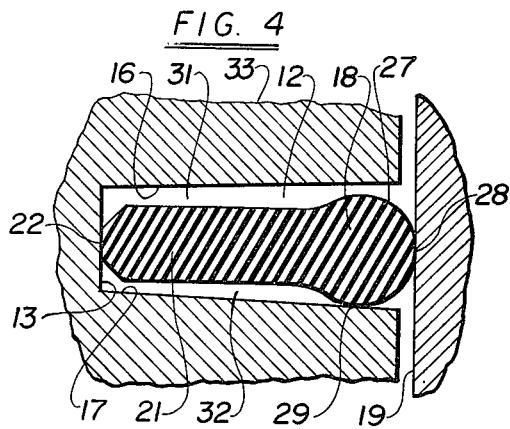
FIG. 4 is a fragmentary cross sectional view on an enlarged scale of the seal ring and its associated parts in one sealing position of the ring.
Figure 5:
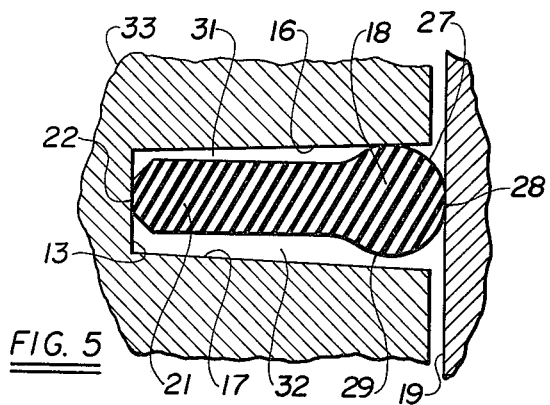
FIG. 5 is a fragmentary cross sectional view similar to FIG. 4 showing a second sealing position of the ring.
Figure 2:
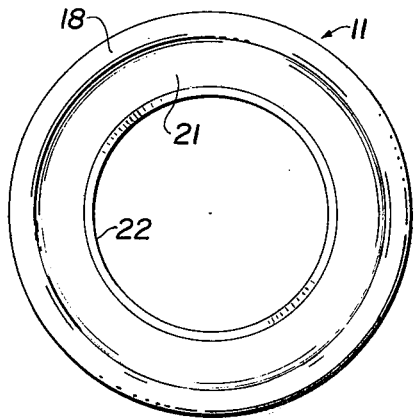
FIG. 2 is a plan view of the seal ring.
Figure 3:
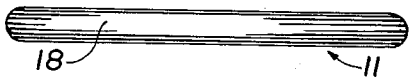
FIG. 3 is an edge elevation of the ring.
Figure 6:
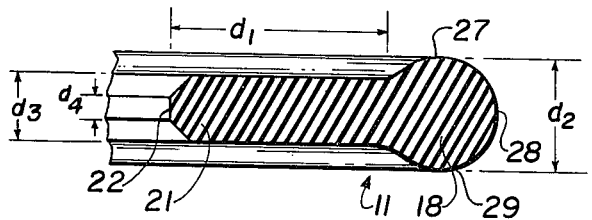
FIG. 6 is a fragmentary cross sectional view of the seal ring.

As will be best seen from FIGS. 4–6, the free periphery of one torus section taken in an axially extending plane and as seen in these views comprises a circular segment greater than 180° to thus provide three perpendicularly related arcuate sealing surfaces 27, 28, and 29 for sealing engagement with groove sidewalls 16 and 17 and the opposed sliding surface 19 in the same manner as a floating O ring hereinabove described. The specific improvement of the present invention is the provision of the integral concentric web 21 which extends to, and provides a seal at, the root wall 13. Accordingly, there is defined on opposite sides of the web pressure chambers 31 and 32 for providing a positive fluid drive of the torus portion 18 to one of its two sealing positions as illustrated in FIGS. 4 and 5. For example, when fluid pressure is applied from the top of the ring groove member 33, as seen in FIGS. 1 and 4, fluid pressure will build up in chamber 31 between sidewall 16 and web 21 to drive torus portion 18 downwardly, as seen in FIG. 4, to engage sealing surface 29 with groove sidewall 17. Since the ring is sealed at its opposite surfaces 22 and 28, the pressure build-up in chamber 31 to displace the ring to sealed position, as seen in FIG. 4, will be positive and dependable regardless of whether the pressure build-up is slow or fast. In a reverse manner, fluid pressure applied from the bottom of member 33, as seen in FIG. 5, will cause a fluid pressure build-up in chamber 32 and a driving of the torus portion 18 to engage its sealing surface 27 against sidewall 16.

The seal ring of the present invention is composed of soft compressible rubber of the type used for conventional O rings and having a durometer of about 60 to 80 shore A hardness. Nitrile or Buna N (NBR) is a common basic elastomer for O rings and is obtainable from various commercial sources including Goodyear Tire & Rubber Co., Firestone Tire & Rubber Co., Naugatuck Chemical, Goodrich Chemical Co., and others. Fluorocarbon Rubber (FPM) may also be used. This material is obtainable from E. I. DuPont D. E. Nemours Company under the trade name Viton.

Also important in the present seal ring is the proportioning of the web as being relatively long and thin compared to the torus portion so as to afford sealing of the peripheral surface 22 of the ring against the root wall 13 with minimum pressure, thus minimizing the attendant friction at the relatively moving surfaces 19 and 28. Specifically, the dimension $d_1$, FIG. 6, of the radial extension of web 21 from the torus portion 18 is at least equal to and preferably greater than the diameter $d_2$ of the torus section as seen in the axially extending plane of FIG. 6 thus making the radial dimension of web 21 greater than the radial dimension of the torus section. Also, the web thickness, dimension $d_3$, is preferably not greater than about one-half of the torus diameter $d_2$ so as to afford ease of flexibility and compressibility of the web and the web is integrally joined to the torus portion at its center plane and spaced from the three perpendicularly related arcuate sealing surfaces 27, 28 and 29. In this connection also, the peripheral edge surface 22 of the web is preferably reduced as indicated by dimension $d_4$, FIG. 6, thereby decreasing the force required for obtaining the seal between surface 22 and root wall 16.

As will be observed, the simultaneous seal of the web and torus portions may be obtained by dimensioning the ring diameters of these portions. This may be attained in either of two ways. Where the torus section surrounds the web as depicted in FIG. 1, the internal diameter of the web may be made a little smaller than the root diameter of the groove while the external diameter of the torus portion is made somewhat larger than the internal diameter of surface 19. Since only a very small pressure is required to obtain the web seal, the engagement of web surface 22 against root wall 13 may be obtained solely by the squeezing action of the ring against surface 19. This condition may be obtained even though the internal diameter of surface 22 is larger than the external diameter of root wall 13. In either case, there is a significant overall reduction in force as compared to the conventional O ring squeezed between a cylinder and root wall of the ring groove.

While the illustration in FIG. 1 depicts a piston mounted sealing ring working within a cylinder wall 19, it will be understood that the invention is equally applicable to a reverse arrangement of a cylinder mounted ring sealing against an axially reciprocating shaft. In the first case, the torus portion will surround the web. In the second case, the web will surround the torus portion. Otherwise, all of the relationships and functions hereinabove described are the same.

As another feature of the seal ring of the present invention, the pressure chambers 31 and 32 hereinabove described provide ideal lubricant storage chambers for providing gradual lubricant delivery to the working surfaces thereby reducing friction and prolonging the useful life of the ring. As will be observed, the reciprocal displacement of the ring in the ring groove will provide a lubricant feed as required to the working surfaces. For example, the present seal ring as used in a pneumatic control valve of the type disclosed in U.S. Pat. No. 3,516,442 has continued to function with ease and precision under tests out to 50 million cycles with relubrication at about 25 million cycles. Where the seal ring is used for valving operations such as on a spool valve, the diameter of the torus section may be made quite close to the width of the groove so that minimum ring displacement is required to perform its reciprocal motion sealing function. Such an arrangement enables the opening and closing of valve ports with repeatable precision and minimum axial movement of the spool. Also the present seal ring may be manufactured with wider tolerances than the customary O ring due to the overall reduction in force required to effect the simultaneous seal at the cylinder surface and groove root wall.

Preferably, the side walls 16 and 17 of ring groove 12 are divergently tapered from root wall 13, as seen in the drawings, to reduce the width of the groove at its root surface and the attendant required reciprocal travel of the seal member. Also, the gradual squeeze action of the web toward the torus portion assists in a rolling action of the torus portion and a controlled release of lubricant.

We claim:

1. A seal ring structure comprising:

telescopically mounted axially displaceable parts; one of said parts being formed with a ring groove having a root wall and opposed side walls divergently tapered from said root wall; the other of said parts being formed with a cylindrical surface opposed to said groove;

a seal ring of elastomeric material mounted in said groove and comprising a torus portion of segmental circular cross section having a diameter less than the width of said groove between said side walls and juxtaposed to said side walls and extending from said groove for engagement with said cylindrical surface, and an annular flexible and compressible web secured concentrically to and integrally formed with said torus portion and extending radially therefrom; said web having a thickness less than the diameter of said torus portion and being joined to said torus portion at its center plane thereby leaving a free torus portion at its center plane thereby leaving a free torus portion periphery comprising a circular segment greater than 180° to provide three perpendicularly related arcuate sealing surfaces providing line contacts with said groove side walls and said cylindrical surface, the radial extension of said web from said torus portion being at least equal to the diameter of said torus portion, the elastomeric material forming said torus portion and web having a durometer of about 60 to 80 Shore A hardness;

said ring defining with said groove side walls chambers on opposite sides of said web;

lubricant mounted in said chambers;

said web co-functioning with said groove side walls to displace lubricant to said arcuate sealing surfaces; and the ring diameters of said torus portion and said web providing simultaneous pressure set against said cylindrical surface and said root wall respectively.

2. A seal ring as defined in claim 1, the free periphery of said web having a reduced thickness for providing a decreased sealing area engagement with said root wall.

* * * * *